Patented Feb. 16, 1943

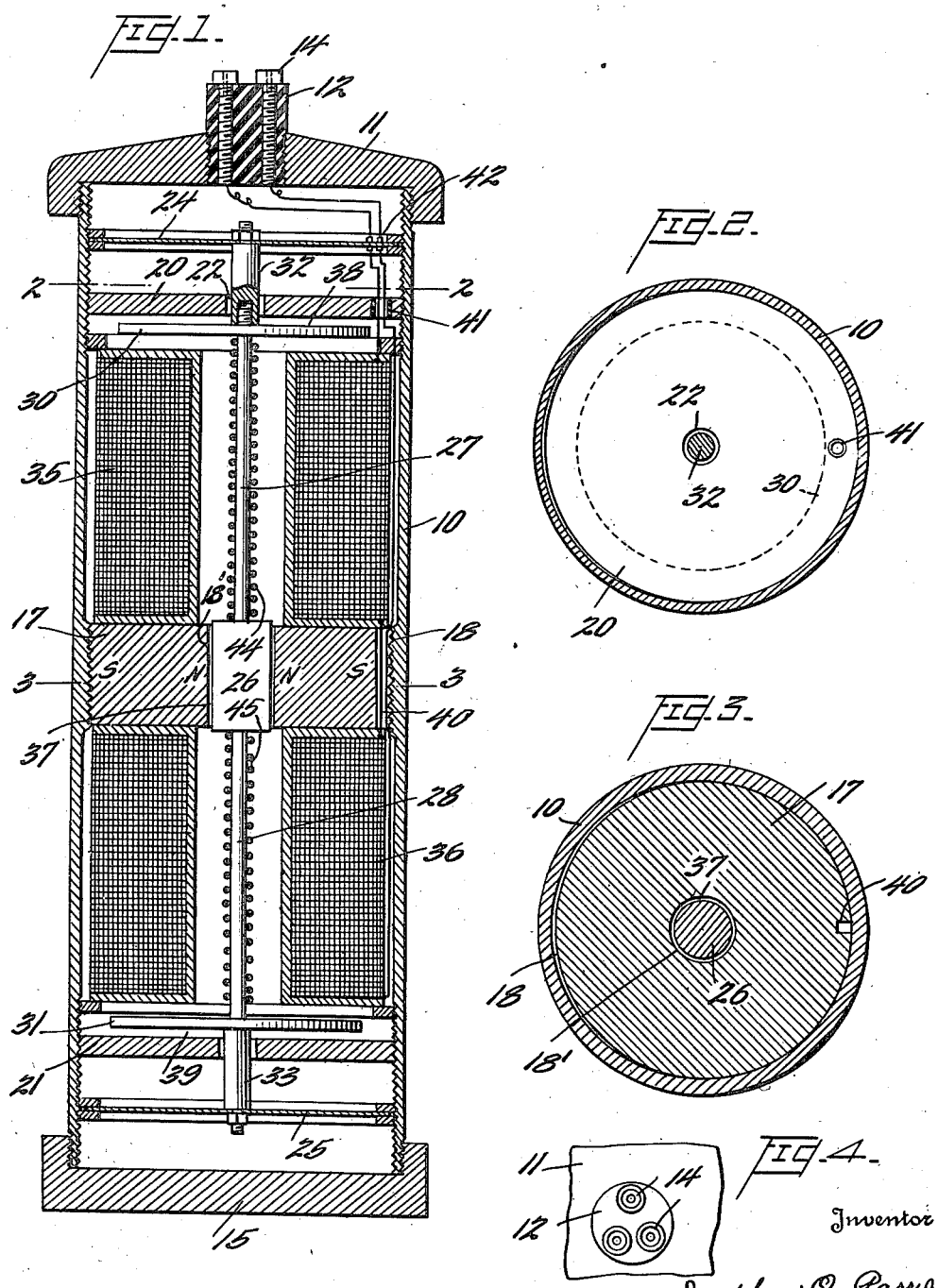

2,311,079

UNITED STATES PATENT OFFICE 2,311,079

TRANSDUCER

Josephus O. Parr, Jr., San Antonio, Tex., assignor to Olive S. Petty, San Antonio, Tex.

Application March 28, 1940, Serial No. 326,509

12 Claims. (Cl. 177—352)

This invention relates to portable seismometers primarily intended for seismic surveying as practiced in connection with geophysical prospecting, and it relates particularly to the electro-mechanical transducer type of seismometer.

It is a general object of the present invention to provide a novel and improved portable seismometer operating on the variable reluctance principle to generate a variable signal voltage representative of seismic waves.

More particularly it is an object of the invention to provide, in an electro-mechanical transducer, a steady-mass which is extremely light in comparison to the case or frame whereby a uniform signal response is obtained irrespective of the character and/or consistency of the soil on which the transducer is supported.

Another object of the invention consists in providing an electro-mechanical transducer in which the steady-mass is extremely light, and in which the total flux effective to produce signal voltages is large whereby electrical damping of the steady-mass is available even up to and exceeding critical values.

A further important object of the invention consists in the construction of a portable seismometer in which the apparatus has substantially the same over-all density as the soil in which it is placed so that the seismometer moves and acts substantially the same as the adjacent earth.

An important feature of the invention consists in the use of two signal generating coils arranged for additive signal voltage combination and for subtractive hum voltage combination so as to produce a high signal output and a low extraneous field output.

As a further important feature of the invention the seismometer provides an output in the form of an alternating voltage substantially symmetrical on both half cycles and of substantially equal value for similar movements of the steady-mass in respect to the casing at any part of the stroke thereof so that all parts on each cycle are recorded with substantially the same intensity.

Other and further features and objects of the invention will be more apparent to those skilled in the art upon a consideration of the accompanying drawing and following specification wherein is disclosed a single exemplary embodiment of the invention with the understanding that such changes and modifications may be made therein as fall within the scope of the appended claims without departing from the spirit of the invention.

In said drawing:

Figure 1 is a vertical central section through an electro-mechanical transducer constructed in accordance with the present invention;

Figure 2 is a section taken on line 2—2 of Figure 1 illustrating one of the pole-pieces;

Figure 3 is a transverse section taken on line 3—3 of Figure 1 and illustrating the construction of the permanent magnet; and Figure 4 is a fragmentary top plan view of the casing.

In the construction of seismometers for recording natural earthquakes or artificial earth shocks such as those resulting from blasts, the operation of heavy machinery and the like, efforts have heretofore been made, and with some measure of success, to produce a seismometer in which the so-called steady-mass is of such magnitude and is so supported or sprung in relation to the case or frame that extremely long periods or low frequency of natural oscillation of the steady-mass was achieved, so that waves of various frequencies would be fairly accurately recorded as a result of the relative movement between the steady-mass and the supporting structure therefor. In all of such known constructions for portable use the steady-mass itself is of many times the weight of the casing or supporting structure, based on the theory that it should remain as nearly fixed in space as possible and that the casing should move in respect to the same to provide the means for directly recording seismic waves or for generating electric currents or voltages for the operation of galvanometers or other recording mechanism.

The above types of seismometers have been relatively satisfactory under most conditions, but for field work in the prospecting for oil and minerals it is often necessary to use portable seismometers in very soft and/or sandy soil such as that encountered in marshes, at the bottoms or along the shores of rivers and lakes, etc. Some of this soil is of gelatinous consistency and of low density and has very poor wave transmission qualities. If an effort is made to use a conventional type of seismometer in such soil the results are not satisfactory and are not at all comparable with results achieved using the same seismometer on firmer soil, clay, rock, foundations, or the like. For certain seismic prospecting it is extremely important that the recorded traces of seismic waves resulting from each blast or "shock" be the result of the operation of a plurality of spaced seismometers not substantially independently affected by the type of soil on or in which they are placed. For instance a number of seismometers may record simultaneously from a single shock and some may be placed in soft soil and others in more firm soil or on rock. In computing the time of seismic wave travel to these various seismometers, in intervals as short as a thousandth of a second, it is extremely important to know that the recording has been done by seismometers whose response and phasing are uniform.

Uniform response cannot be had with heavy steady-mass seismometers operating in different types of soils because of the so-called dipole effect occasioned by the action of restoring forces operating between the steady-mass and the casing of the seismometer. With any of the forms of seismometers heretofore known, arranged in soft mud or in certain types of sand, the seismometer cannot be assumed to be truly fixed to the more or less solid earth, where the seismic disturbances orginate and travel for most of their paths, and which has a large mass in comparison with the mass of the so-called steady-mass. This being the case, the provision for relative motion with restoring forces between the steady-mass and the case will cause the case to move differently than it would if the steady-mass were not connected to it by means which exert a restoring force.

The above can better be appreciated if it is considered that when the case is pushed upward by energy from the ground, the steady-mass will tend to pull back on the case with a force equal to $mg+ma$, where $m$ is the mass of the so-called steady-mass, $g$ the gravitational acceleration, and $a$ the acceleration of the steady-mass with respect to the center of the earth. If the period of the steady-mass is very large, or the frequency of the sprung system very low, in comparison to the frequency of the incoming waves, the steady-mass will have very little acceleration and the force exerted on the case by the steady-mass will be nearly constant regardless of whether or not the energy is attempting to move the case of the seismometer. However, should the resonant frequency of the steady-mass be comparable with the frequency of the incoming waves, then the steady-mass would tend to move appreciably, i. e., have appreciable acceleration, and would exert an appreciable force on the case. When this case is setting in the above mentioned soft earth, there would be a great tendency for this added force from the steady-mass onto the case to restrict the motion of the case to less than that of the surrounding earth and to cause a reduction in the magnitude of relative motion between the two parts of the seismometer from that which would exist if the case were resting on or fixed to solid ground.

Furthermore, if the soil were soft enough and had a viscosity approximately the same as the damping fluid used in the conventional type of detector and if the case had a mass approximately equal to the mass of the so-called steady-mass, then the device would not only be exceedingly insensitive to energy but would act as if the steady-mass was suspended with a resonant frequency approximately twice its normal resonant frequency. In other words, the spring, diaphragm or other suspending and restoring means would cause the casing to execute very peculiar motions under these conditions and the results would be similar to those from a seismometer having a steady-mass of an entirely different resonant frequency. This variation would be a function of the type of soil on which the seismometer rested or in which it was embedded so that there could conceivably be a very radical difference in the operation of the seismometer depending on whether it was in or on soft or hard material. This is extremely bad because it would change the character of and time intervals on the record and hence introduce serious errors in interpreting such record.

If now, in accordance with the present invention the mass of the so-called steady-mass be made extremely small, particularly in comparison to that of the case, then the second term $ma$ of the above equation would be very small because the mass of the sprung system would be small. This presupposes that the original resonant frequency on solid ground would be the same as for the heavier steady-mass previously referred to, which of course could be effected by the use of a suspension system employing less restoring force. A further important advantage of an extremely light steady-mass is that it permits reducing the over-all weight of the whole seismometer so materially that the same can have a density closely comparable to that of the soil in which it is intended to be placed and thereby move and act more nearly like the ground which it replaces, thus eliminating secondary or forced vibrations of the case and other difficulties.

In carrying forward the basic idea of reducing the weight of the steady-mass to a minimum other important improvements are achieved. The most satisfactory form of seismometer for portable use has been the electro-mechanical transducer type where the reluctance of a magnetic circuit is varied by seismic shocks which change the length of an air gap therein thus varying the interlinkage of flux with a coil which then generates a variable signal voltage. This type of transducer, with the steady mass reduced in weight to a minimum, is particularly susceptible to electric damping which is much more satisfactory from several standpoints than the use of a viscous liquid. Such liquid is subject to variations in viscosity in accordance with temperature, adds to the weight of the seismometer which decreases portability and is susceptible to leakage and other troubles. With electromagnetic damping high frequency responses of the seismometer can be materially and rapidly reduced and since the low frequencies are those most desired for record, this is of particular importance. Electrical damping functions by velocity rather than displacement and hence by using the same it is possible to overdamp the detector to get excellent high frequency cut-off without introducing poor damping. The required light moving mass is already available as previously explained and a low resistance coil is easily provided preferably by separating it from the signal coil and it only remains to have an appreciable total change of flux available to provide the necessary damping and this can be done as will be later described.

Referring now to the drawing for a better understanding of the construction and operation of the apparatus of the present invention there is shown in Figure 1 a vertical section through the center of a transducer of substantially full size and of the type intended to be portable for use in seismic surveys. Such apparatus must be water, moisture, and dust-tight and for simplicity the outside shell or casing 10 is a circular metal tube of relatively thin wall and, for purposes to be later described, is formed of a magnetic material, preferably soft iron or mild steel. It is capped at the top as shown at 11 by a threaded cover also of magnetic material such as cast iron, which cover contains an insulating plug 12 equipped with suitable terminal sockets 14 for the attachment of conductors which may lead to an amplifier and subsequently the recording galvanometer. The lower end of the casing is closed by a base 15 which may also be of magnetic material. It will be seen that the outer casing is of extreme simplicity, great sturdiness, and relatively light weight, and being entirely of magnetic material offers considerable shielding to the mechanism contained therein and to a large extent protects the equipment from stray electrical and magnetic fields such as might exist beneath power or telephone lines, near radio stations, heavy machinery and the like.

The casing tube 10 is incorporated in the magnetic circuit of the transducer by mounting centrally of the length thereof a permanent magnet 17 of annular form. It is preferably closely fitted to the inner walls of the tube as by threads 19 as shown or it may be clamped between locking rings engaging threads in the wall of the tube. This permanent magnet is formed of suitable alloy material for the purpose and is provided with a central cylindrical aperture 18', the walls of which constitute one pole, preferably the north, of the magnet, while the circumference of the annular disc constitutes the south pole of the magnet. The magnet is thus quite short, and should preferably be formed of some material of high coercive force.

The casing tube is also provided with a pair of annular pole-pieces 20 and 21 of identical construction, one arranged near the top and one near the bottom of the tube as shown. They may also be threaded in the tube or clamped between appropriate locking rings in any desired manner. They are preferably relatively thin discs of magnetic material each provided with a central opening 22.

In order to complete the magnetic circuit the steady-mass of the seismometer is mounted coaxially in the tube and sprung between suitable supporting springs which, as shown, constitute thin diaphragm discs 24 and 25, one near each end of the tube and beyond the pole-pieces. These discs may be appropriately perforated and of the desired thickness to have such a resiliency that combined with the weight of the steady-mass they produce the desired natural frequency of oscillation most appropriate for operation under the conditions to which the seismometer is subjected. Obviously the steady-mass may be mounted by other known means and provided with such restoring forces as necessary to bias it toward a central position, as shown.

The steady-mass comprises a central or armature portion 26 in the form of a soft iron plug or cylinder closely filling the opening 18' in the magnet 17 but without touching the walls of the same. A pair of soft iron rods 27 and 28 extend respectively from the top and bottom centers of the armature and each carries at its outer end a disc 30 or 31, respectively, formed of suitable magnetic material of low retentivity as are all parts of the magnetic circuit except the permanent magnet. These discs are spaced inwardly only sufficiently from the inner faces of their cooperating pole-pieces 20 and 21 to permit the necessary relative movement between the sprung steady-mass and the casing under the action of seismic shocks without making actual contact and causing magnetic sticking of either disc to its pole-piece about which more will be said later. Each disc is attached to its adjacent diaphram by means of a non-magnetic stud 32 or 33 which passes through the opening in the pole-piece as shown and is attached both to the disc and the diaphragm.

To complete the apparatus a pair of signal coils 35 and 36 is provided, one mounted in the casing above and the other below the permanent magnet. These coils each comprise a large number of turns of wire arranged on a spool having a central bore shown as of sufficient diameter to pass the armature cylinder 26 during assembly but with certain forms of construction this is not necessary and the coils can be of smaller diameter. The length of the spool is such as to occupy substantially all of the space between the permanent magnet and the pole disc on the steady-mass. The direction of winding of the conductors on the two coils 35 and 36 is opposite so that any stray fields, as previously described, which may penetrate the magnetic casing will generate voltages of opposite polarity in the two windings which are connected together, in a manner to be later described, to thus cancel out the effects. This effect combined with the magnetic shielding, produces a seismometer with a surprisingly small amount of unwanted energy output.

The magnetic circuit of the seismometer consists really of two parallel magnetic circuits, the magneto-motive-force for which originates in the same central permanent magnet. The whole casing or tube assumes the polarity induced in it by the periphery of the permanent magnet so that consequently the pole-pieces 20 and 21 are of the same polarity. The armature 26 has induced in it a polarity opposite to that of the central pole of the permanent magnet which in turn magnetizes the pole discs 30 and 31 to a like polarity opposite to that of the pole-pieces. The air gap 37 between the central pole of the permanent magnet and the armature 26 remains constant irrespective of vertical movement of the steady-mass, but the air gaps 38 and 39 respectively positioned between the upper pole-piece and upper pole disc and the lower pole-piece and lower pole disc are adapted to be changed in size by seismic shocks and thus vary reluctance and hence the total flux flowing in their portion of the parallel magnetic circuits. It is to be noted particularly that these two gaps vary in size inversely so that any relative movement between the casing and steady-mass serves to increase one gap while the other decreases, but the sum of the two gaps, which are of equal size when the steady-mass is in repose, is always equal to a fixed distance.

The magnetic circuits are such that the flux density in each of the variable air gaps is relatively low; first because the magneto-motive-force obtainable with the very short permanent magnet is low, and second, the area of the pole faces of each of the gaps is large. This latter arrangement provides for a large total flux in each of the air gaps. The low flux density in the gaps is desirable since it reduces the tendency to stick, for sticking is proportional to the square of the flux density and only directly to the cross-sectional area of the air gap. The above construction provides for a large total flux linking the signal coils, which flux passes through the large area gaps at low flux density. Magneto-motive-force and hence flux density is proportional to the first power of the length of the permanent magnet assuming no reluctance other than the gap in the circuit, while the total flux in each variable air gap is proportional to the square of the radius thereof so it will be seen that the short magnet length resulting from the small diameter of the casing does not seriously reduce the total flux in the same proportion as the magneto-motive-force.

Relative movement between the steady-mass and the casing decreases one air gap and increases the total flux in its portion of the magnetic circuit. At the same time the other gap increases and the total flux flowing in its circuit is reduced. The increase in flux generates a voltage by the changes of linkage in the cooperating coil while the decrease in flux produces a similar result in the other coil. The coils being wound in opposite direction and properly connected, give an additive summation of the generated signal voltages so that the output of the detector is almost twice that of a single coil type of detector. This increases materially the ratio of wanted to unwanted signals and permits the use of lower amplification between the seismometer and the galvanometer whereby superior results on the record are obtained.

It is previously stated that the two coils 35 and 36 are oppositely wound, but the same result can be obtained by winding them in the same direction and making the appropriate connections which will cause a summation of the signal voltages and a bucking of the stray field voltages. The coils being connected in series, the several conductors pass through a slot 40 in the permanent magnet and a hole 41 in the pole-piece 20 and through appropriate openings 42 in the upper diaphragm and are led to two of the terminal screws 14 in the insulation plug. The third terminal screw, as seen in Figure 4, is used for a ground connection to the case.

Because one air gap is being enlarged while the other one is being decreased and vice-versa, the output of this type of seismometer is substantially symmetrical on both half cycles of the alternating signal current. Furthermore, the output is substantially the same for each increment of movement at the same speed, in spite of the position of the steady-mass. This is in contradistinction to the usual type of seismometer which is less sensitive at parts of the cycle where the poles forming the air gap are farthest apart and more sensitive when the poles are closest together. The present construction results in almost equal sensitivity at all positions of the poles.

It will be appreciated that the relatively light steady-mass and fairly stiff springs will produce rapid damping, but to increase this damping which is already augmented by the air in the narrow gaps between the pole-pieces and discs, a pair of coils 44 and 45 is wound, one on each of the rods 27 and 28 connecting the armature to the pole discs. These coils are shown as of but a single layer of spaced turns for the sake of convenience of illustration, but it will be appreciated that any suitable number and disposition of turns may be provided in order to obtain the desired degree of damping. These coils are short-circuited upon themselves and energized by the changing flux and act, when moved in respect to the signal coils in which current is flowing, in accordance with Lenz's Law, in that each generates a current, directly proportional to the velocity of motion, which tends to oppose the motion. Hence the higher the velocity the greater the opposition and the better the selectivity of the detector for low frequency signals. It will be seen that signals of high frequency will be substantially damped out and since the seismic waves seldom have a frequency higher than 70 or 80 cycles per second, this is of great advantage.

It is clear from the above description that the steady-mass in this detector has a minimum weight, carrying only the necessary parts to complete the magnetic circuit and to provide the small damping coils. Furthermore, the whole structure is relatively light in weight and can easily be constructed to approach in density the density of the ground in which it is intended to be used.

Having thus described the invention, what is claimed as new and desired to be secured by Letters Patent is:

1. A magnetic seismometer including, in combination, a cylindrical, tubular casing of magnetic material, a pole piece at and magnetically associated with each end of the casing, a steady mass of magnetic material spring supported from and in said casing for relative axial movement in respect to said pole pieces, a permanent magnet intermediate the ends of the casing and extending from the same toward the steady mass to provide and energize two parallel magnetic circuits the reluctances of which are inversely varied by said relative movement, a pair of similar coils fixed in said casing and each adapted to generate a voltage when linked by changing magnetic flux in one of said circuits resulting from such relative movement, said coils being so wound and connected together as to add the generated signal voltages, said connection being such as to cause voltage generated in the coils by stray fields to oppose and cancel each other.

2. In an electro-magnetic transducer of the type described, the combination of a tubular casing of magnetic material, an annular permanent magnet supported by and near the center of said tube and being magnetized with one pole at the central opening and the other pole at the case engaging periphery, an annular pole-piece near each end of the tube, a coil supported coaxially by said tube for each end thereof and between the central magnet and the corresponding pole-piece, a steady-mass spring supported coaxially in and from said casing and including an armature within said magnet, a disc slightly spaced from each pole-piece, and a rod of magnetic material connecting the armature and discs.

3. In an electro-magnetic transducer of the type described, the combination of a tubular casing of magnetic material, an annular permanent magnet supported by and near the center of said tube and being magnetized with one pole at the central opening and the other pole at the case engaging periphery, an annular pole-piece near each end of the tube, a coil supported coaxially by said tube for each end thereof and between the central magnet and the corresponding pole-piece, a steady-mass spring supported coaxially in and from said casing and including an armature within said magnet, a disc slightly spaced from each pole-piece, a rod of magnetic material connecting the armature and discs, and a closed circuit coil carried by said mass for each fixed coil to provide damping for the mass.

4. In an electro-mechanical transducer of the type described, the combination of a tubular casing of magnetic material, permanent magnet means supported by and near the center of the tube and being magnetized with an inner pole facing an opening coaxial with said tube and an outer pole engaging the tube wall, a pole-piece near each end of the tube and connected to and energized therefrom, a steady-mass spring supported coaxially in and from said tube and comprising an armature in said opening having a pole tip for cooperation with each of said pole-pieces to provide an air gap and permit relative case-to-mass movement without engaging, a coil surrounding each portion of the armature adjacent its pole tip and fixed to the casing, said coils being connected for adding the voltages simultaneously generated therein by said relative movement.

5. In an electro-mechanical transducer of the type described, the combination of a tubular casing of magnetic material, permanent magnet means supported by and near the center of the tube and being magnetized with an inner pole facing an opening coaxial with said tube and an outer pole engaging the tube wall, a pole-piece near each end of the tube and connected to and energized therefrom, a steady-mass spring supported coaxially in and from said tube and comprising an armature in said opening having a pole tip for cooperation with each of said pole-pieces to provide an air gap and permit relative case-to-mass movement without engaging, a coil surrounding each portion of the armature adjacent its pole tip and fixed to the casing, said coils being connected for adding the voltages simultaneously generated therein by said relative movement, and a closed circuit coil movable in respect to each of said fixed coils to damp the movement of the steady-mass.

6. In an electro-mechanical transducer of the type described, the combination of means forming similar variable air gaps in two parallel magnetic circuits of metal, a common source of magneto-motive-force for said circuits including a fixed air gap in series with both variable gaps, means mechanically connecting together a metal portion of each circuit to provide a mass responsive to seismic waves to vary said first mentioned air gaps inversely to thereby change the flux in each circuit, a separate coil subject to each circuit flux change to generate a signal voltage, and means combining said voltages additively.

7. A portable electro-mechanical type transducer for use in field work comprising, in combination, a casing, magnetic parts forming an open magnetic circuit fixed in said casing and including energizing means for the same, a steady mass of magnetic material in and spring supported from said casing and so included in said magnetic circuit as to provide an air gap variable in width upon relative movement of the casing and mass to provide a variation in reluctance, a coil cooperating with said circuit to produce signal voltages corresponding to reluctance changes, and a closed circuit coil carried by said mass remote from said gaps to provide electrical damping for the same, the entire steady mass being lighter in weight than the casing and parts supported thereby.

8. In an electro-magnetic transducer of the variable reluctance type, in combination, a permanent magnet of large cross-section and short length, a pole piece in circuit with said magnet, an armature assembly having a portion cooperating directly with one pole of said magnet through a fixed air gap and another portion cooperating with said pole piece through a variable air gap, means mounting the armature assembly as a steady mass for movement relative to the magnet, the area of the variable air gap being more than twice that of the fixed gap whereby the tendency to stick is materially reduced and the sensitivity maintained at a maximum.

9. In an electro-magnetic transducer of the type described, the combination of a tubular casing of magnetic material, an annular permanent magnet supported by and near the center of said tube and being magnetized with one pole at the central opening and the other pole at the case engaging periphery, an annular pole-piece near each end of the tube, a coil supported coaxially by said tube for each end thereof and between the central magnet and the corresponding pole-piece, a steady-mass spring supported coaxially in and from said casing and including an armature within said magnet, a disc slightly spaced from each pole-piece, and a rod of magnetic material connecting the armature and discs, said armature being spaced from the central magnet aperture by an air gap of constant area, said discs each being spaced from the corresponding pole piece by a variable air gap, the area of the fixed gap being a fraction of the area of either variable gap of less than one half.

10. An electro-magnetic transducer of the variable reluctance type, in combination, a tubular magnetic sleeve, an annular permanent magnet supported with its periphery engaging the sleeve and comprising one pole and with the opening comprising the other pole, an annular pole piece near one end of the sleeve, a coil in said sleeve between the magnet and pole piece, a steady mass spring supported coaxially in and from the sleeve and including an armature cooperating through a fixed air gap with the central pole, a disc spaced from the pole piece by a variable gap and a rod of magnetic material connecting the armature and disc, the area of the fixed gap being substantially less than that of the variable gap.

11. In an electro-magnetic transducer of the type described, the combination of a tubular casing of magnetic material, an annular permanent magnet supported by and near the center of said tube and being magnetized with one pole at the central opening and the other pole at the case engaging periphery, an annular pole piece in the tube and spaced from the magnet, a coil coaxially mounted in said tube between the magnet and pole piece, a steady mass spring supported coaxially in and from said casing and including an armature spaced within said magnet to form a fixed air gap, a disc spaced from said pole piece to form a variable gap, and a rod of magnetic material extending through said coil and connecting the armature and disc, the cross-sectional area of the variable gap being of the order of a hundred times that of the said rod.

12. In an electro-magnetic transducer of the type described, the combination of a tubular casing of magnetic material, an annular permanent magnet supported by and near the center of said tube and being magnetized with one pole at the central opening and the other pole at the case engaging periphery, an annular pole piece in the tube and spaced from the magnet, a coil coaxially mounted in said tube between the magnet and pole piece, a steady mass spring supported coaxially in and from said casing and including an armature spaced within said magnet to form a fixed air gap, a disc spaced from said pole piece to form a variable gap, a rod of magnetic material extending through said coil and connecting the armature and disc, the cross-sectional area of the variable gap being of the order of a hundred times that of the said rod, and a closed circuit damping coil mounted on and for movement with said rod.

JOSEPHUS O. PARR, Jr.